United States Patent [19]

Knight et al.

[11] 3,952,110

[45] Apr. 20, 1976

[54] DRY MIX FOR COATING FOODS

[75] Inventors: Ronald M. Knight, Cobourg;
Elwood J. Thompson, Peterborough;
Jean E. Cain, Cobourg, all of Canada

[73] Assignee: General Foods, Limited, Toronto, Canada

[22] Filed: July 1, 1974

[21] Appl. No.: 484,534

[30] Foreign Application Priority Data

July 3, 1973  Canada .................................. 175471

[52] U.S. Cl. ............................... 426/296; 426/555; 426/302
[51] Int. Cl.² .............................................. A23L 1/01
[58] Field of Search ............ 426/152, 289, 296, 302, 426/305, 293, 281, 555

[56] References Cited

UNITED STATES PATENTS

| | | | |
|---|---|---|---|
| 3,235,385 | 2/1966 | Cull | 426/186 |
| 3,552,978 | 1/1971 | Inklaar | 426/281 |
| 3,723,137 | 3/1973 | Fisher et al. | 426/293 |

*Primary Examiner*—Raymond N. Jones
*Attorney, Agent, or Firm*—Bruno P. Struzzi; Thomas V. Sullivan; Mitchell D. Bittman

[57] ABSTRACT

A dry mix for coating foods comprising a farinaceous ingredient and buffering agent is described. The mix which may also contain a spice ingredient as well as other edible ingredients is adapted for coating proteinaceous foods especially meats and particularly pork such that, upon roasting or baking, improved and uniform texture and juiciness in the foods are obtained.

8 Claims, No Drawings

DRY MIX FOR COATING FOODS

Breading, dusting, flouring and otherwise coating foods prior to cooking has long been practiced. In recent years, convenience foods such as, for example, dry mixes and convenience-oriented products have become available for easier, less time-consuming preparation of coated foods which are cooked by roasting, baking, broiling, frying and the like.

An example of a convenience type product for use with foods which are to be roasted or baked is the so-called oven cooking bag. Generally, these bags are made from high heat-resistant films since they are adapted to be used at oven temperatures for the roasting or baking of foods. These bags have the advantage that a food such as a meat roast placed within them may be uniformly roasted or baked while, at the same time, juices, gravy, drippings and the like may be retained within the bag. Of course, such bags have the further advantage of preventing oven spattering and spilling from the cooking pan.

Despite these advances, there are certain foods which, upon roasting or baking, apparently do not develop optimum texture nor do they retain their moisture or juiciness during the roasting or baking process. It has been noted that certain meats, especially pork, when they are roasted, do not appear to develop the texture and retain juiciness nor are these characteristics significantly improved when an oven cooking bag of the type discussed above is employed.

While the reasons for development of optimum texture and retention of juiciness during roasting or baking of certain foods, namely meats such as pork, are not completely known, it is believed that the pH of the food prior to, as well as during cooking, has some effect upon the desired and desirable characteristics. Thus, in the case of pork, it has been determined that the pH of pork meat varies from 5.2 to 6.8. This variation will be found in one day's kill at the slaughter house. The pH depends on the quantity of glycogen in the body of the hog before death. After slaughter the glycogen is converted to lactic acid. Many other factors cause the pH variation in pork. Some of these are the age of the hog, the hog's life cycle, the conditions of slaughter, for example, the degree of excitement or exhaustion immediately before slaughter. The production of lactic acid results in a lower pH in the meat. The pH value of the pork roast apparently determines the retention of moisture, that is, the loss or gain of moisture in the pork roast during cooking. However, insofar as we are aware, no cooking method has heretofore been available for adjusting or controlling the pH of pork during cooking and thus controlling the moisture content of roast pork.

Although the prior art has recognized that the texture, moisture and/or juice retention of meats and poultry may be improved by the use of certain additives, insofar as we are aware, the prior art has not indicated that a dry mix for coating foods might achieve these objectives. For example, U.S. Pat. Nos. 2,351,614, 3,104,170, 3,399,063, and 3,552,978 teach various methods and additives for use with meats and poultry. However, it is noted that such additives are either injected into the meats or poultry or are contacted with the meats or poultry in the form of dips, solutions and the like in order to prevent weight loss.

We have now discovered a dry mix for coating proteinaceous foods especially meats, such as pork, which when applied to the surface of the meats provides an improved and uniform texture and allows for retention of juiciness of the foods when they are roasted or baked.

The dry mix of this invention comprises a farinaceous ingredient such as, for example, a starch or a flour and a buffering agent. The mix may also include a spice ingredient as well as other ingredients such as other flours or starches, fats, sugars, condiments, gums, herbs, colors and flavors.

An essential feature of the dry mix of this invention is the inclusion therein of a buffering agent. The buffering agent may be any one of a large number of edible ingredients, materials or compounds which function to maintain an acidic pH of the coated food prior to and/or during roasting or baking. Illustrative buffering agents include alkali metal phosphates such as sodium dihydrogen phosphate, disodium phosphate, sodium pyrophosphate, sodium hexametaphosphate and the like. However, other buffering agents exemplified by malic acid, malonic acid, succinic acid, glutaric acid and their salts may be also employed. Thus, any buffering agent approved by the governing health regulations and effecting a pH control preferably between 5.2 and 5.5 would be suitable.

It is theorized that the use of such a buffering agent brings about an effective control of the pH or acidity of the meat so that an improved and uniform texture in the roasted or baked meat is obtained and the juices and moisture in the meat are retained.

A further advantage of the dry mix of this invention, especially as it relates to its use with pork, is that so-called dark roasts which have been found to have a higher pH and a higher water-holding capacity may be converted to light-roast types which have a lower pH and a lower water-holding capacity. This advantage is especially attractive when such roasts are roasted or baked in oven cooking bags because the yields of the gravies or juices which are produced during roasting or baking are optimized.

The dry mix of this invention is adapted to be mixed with and contacted with the meats such as a pork roast by any one of several methods such as immersing, dipping, spraying the meats or the like in an aqueous solution or dispersion of the mix. Alternatively, the meats may be moistened first with water and the dry mix then applied to the surface of the meats by shaking, dusting or otherwise coating the mix onto the meats and a sufficient amount of water is added to a cooking bag or covered pot.

The amount of buffering agent in the dry mix is dependent upon the characteristics of the meats or other food products which is coated with the dry mix. In the case of pork, it has been found that the dry mix contains between about 1 and 30% of buffering agent so that when 2 ounces of the mix are blended with 12 ounces of water, and the aqueous solution or dispersion of the mix is applied to the meats, a pH of preferably between about 5.2 and 5.5 in the gravies and juices is obtained.

In order to further illustrate the present invention, the following non-limiting example is furnished.

EXAMPLE

A dry mix is prepared by dry blending the following ingredients:

| Ingredients | Parts by weight |
| --- | --- |
| Wheat flour | 27 |
| Salt | 22.5 |
| Cornstarch | 19.75 |
| Sodium dihydrogen phosphate | 10 |
| Brown sugar | 9.5 |
| Dextrose | 3.75 |
| Citric acid | 0.33 |
| Disodium phosphate | 0.25 |
| Spices and herbs | 6.58 |
| Color | 0.34 |

Two ounces of the dry mix as prepared are blended with 1½ cups (12 ounces) of water and poured over a roast of pork (approximately 4 pounds) in a cooking bag or cooking pan and tied or covered, respectively. The coated roast is then placed in an oven at 375°F for 120 minutes. At the end of the roasting period, the pork roast is removed from the oven and the cooking container. The roast is found to have an improved and uniform texture. It is also found that the gravies and juices which are produced are at an optimum level indicating that the proper degree of moisture retention is achieved.

By contrast, when pork roasts are oven roasted either without a coating or with a control dry mix containing no buffering agents, the textures of about 50% of randomly chosen pork roasts are judged inferior, according to an expert taste panel. In addition, with about 50% of the roasts a poor gravy yield was realized. The inclusion of the buffering agents tended to optimize gravy yields.

While the dry mix of the present invention is particularly suited for meats, especially pork, it may also be employed with proteinaceous foods generally including fowl and seafood.

Although the present invention has been described in conjunction with certain preferred embodiments, features and materials, ingredients and compounds, it is apparent that many suitable alternatives will be apparent to those skilled in the art. Accordingly, the invention is not to be restricted or limited except by the following appended claims.

The embodiments of the invention in which an exclusive property or privilege is claimed are defined as follows:

1. A dry mix composition for coating proteinaceous foods consisting essentially of a farinaceous ingredient and a buffering agent in an amount effective to maintain a pH in the range of about 5.2 to 6.8 of said foods, said buffering agent present in said composition in an amount from about 1 to about 30% by weight.

2. A composition as in claim 1 further consisting of a spice ingredient and a sugar.

3. A composition as in claim 2 in which said buffering agent is an approved water-soluble compound exhibiting effective pH control in the range of 5.2 to 5.5.

4. A composition in claim 3 in which said compound is a compound selected from the group consisting of water-soluble alkali metal phosphates.

5. A process for improving the texture and maintaining the juiciness of proteinaceous foods during roasting or baking which comprises coating said foods with a composition as in claim 1 prior to roasting or baking.

6. A process for improving the texture and maintaining the juiciness of meats during roasting or baking which comprises coating said meats with a composition as in claim 1 prior to roasting or baking.

7. A process for improving the texture and maintaining the juiciness of pork during roasting or baking which comprises coating said pork with a composition as in claim 1 prior to roasting or baking.

8. A process as in claim 7 in which the composition is applied as an aqueous solution or dispersion.

* * * * *